BUELL & BARNES.
Sewing Machine.
No. 21,230.
Patented Aug. 17, 1858.
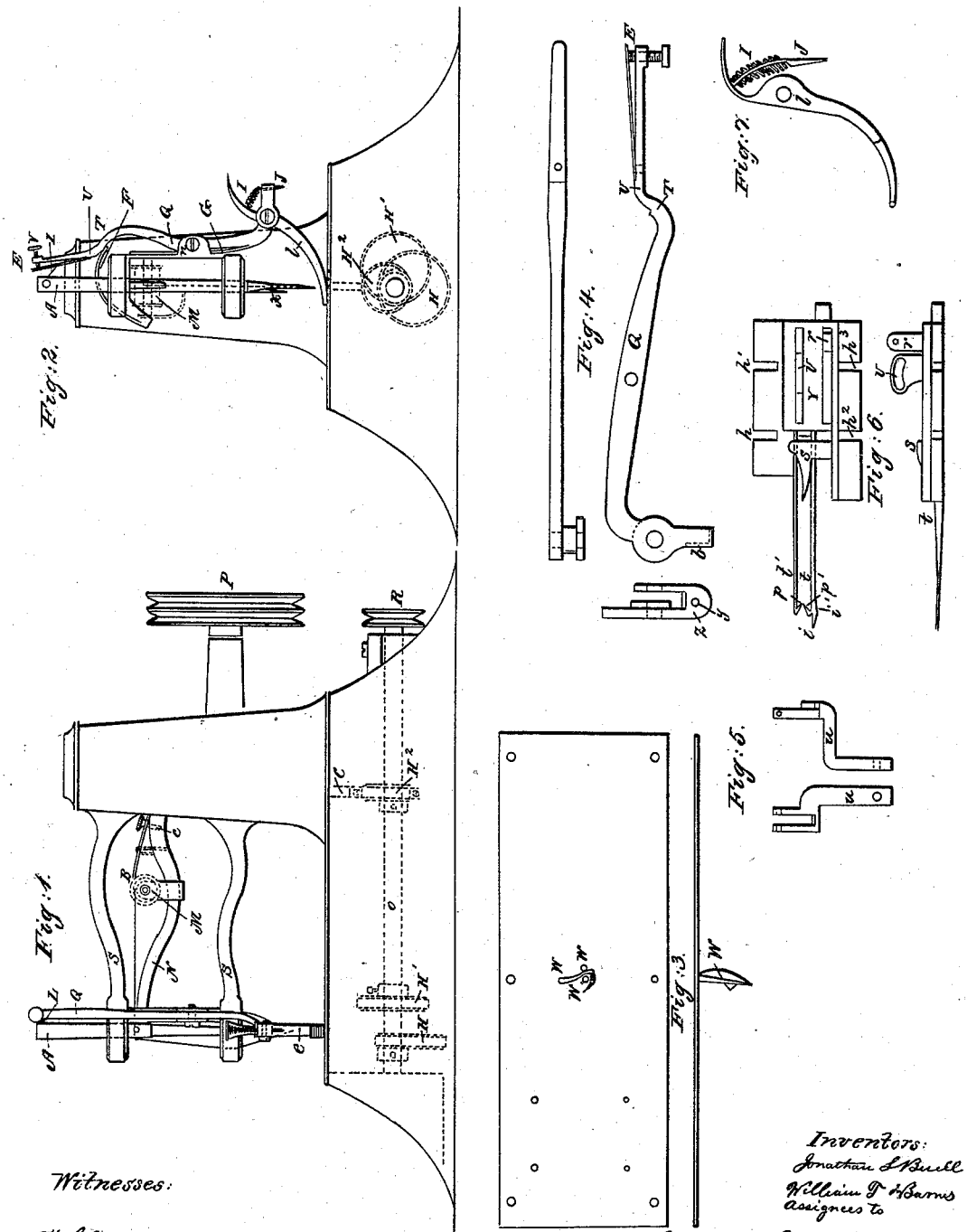
Witnesses:
Inventors:

UNITED STATES PATENT OFFICE.

J. S. BUELL AND W. T. BARNES, OF BUFFALO, N. Y., ASSIGNORS TO J. FORSYTH, R. D. ROCKWELL, V. M. RICE, AND W. T. BARNES, OF SAME PLACE.

IMPROVEMENT IN SEWING-MACHINES.

Specification forming part of Letters Patent No. 21,230, dated August 17, 1858.

*To all whom it may concern:*

Be it known that we, JONATHAN S. BUELL and WILLIAM T. BARNES, of Buffalo, in the county of Erie and State of New York, have invented certain new and useful Improvements in Sewing-Machines; and we do hereby declare that the following is a full, clear, and exact description of the same, reference being had to the accompanying drawings, and to the letters of reference marked thereon.

Figure 1 is a side view of the machine. Fig. 2 is a front view of the machine. Fig. 3 is a view of the bed-plate, full size. Fig. 4 is a view of the feed-bar. Fig. 5 is a view of the arms of the eccentrics. Fig. 6 is a bottom and side view of a frame-work, Y, holding a spear and two hooks in the position in which they operate. Fig. 7 is a side view of the feeder or foot-piece of the feed-bar, with the springs I and J attached to it.

In the several figures similar characters refer to like parts.

A represents the needle-bar, with the projection L attached to it near the top.

M represents the spool, with the spring B pressing upon the thread.

H H' H$^2$ represent the eccentrics, which are attached to the shaft O. On the ring of the eccentric H is fastened the arm $u$, the forked end of which is attached or fastened to the projection $v$, and thus operates the hooks $t$ and $t'$. On the ring of the eccentric H' is fastened an arm similar to that of the arm $u$, the forked end of which takes hold of the projection $v$ and thus operates the spear S. On the ring of the eccentric H$^2$ is fastened the bar $c$, which moves the lever N.

X represents an eyeless needle firmly attached to the lower end of the needle-bar.

Q represents the feeding bar or lever, hinged at $n$, to which is fastened the spring E and the feeder or foot-piece $l$.

On the under side of the bed-plate is fastened the guide W, and the holes through which the needle and the eyeless needle pass (which are marked $u$ and $u'$) may be seen near to it. On the feeding-bar Q is fastened the small plate Z, in which is the hole $z$. Through this hole the spring J on the feeder $l$ passes and catches when the feeder is raised from the cloth.

In Fig. 2, G represents a spring fastened to a projection of the frame-work, and presses against the feed-bar Q, and this pressure gives the lower end of that bar its backward motion.

E represents a spring attached to the frame-work S, and operates against the feed-bar Q in the recess between the points T and U of that bar. P is a pulley. R, same figure, is also a pulley on the end of shaft O, driven by means of a belt from pulley P. The shaft O is operated by the revolution of these pulleys P and R. The eccentrics H, H', and H$^2$, with their attachments, operate the lever N and the spear S and the hooks $t$ and $t'$. The lever N operates the needle-bar A, and the needle-bar, with its projection L near its top, operates the feed-bar Q and the spring F. The feed-bar operates the spring G and also the feeder or foot-piece $l$, attached to said bar. By causing the pulleys P and R to revolve, the shaft O is operated, and the eccentrics and all the other operating parts of the machine are thus set in motion. When the lever N is thus made to operate and the needle-bar A with it, the action of the eccentric H' gives to the spear S a reciprocating motion, and to the hooks $t$ and $t'$ is given a cam motion by the action of the eccentric H and its arm U, operating in the groove or channel of the projection $v$. Said spear and hooks may be operated by the substitution of cams or cranks for eccentrics. When the needle-bar is moved upward, the projection L presses against the inclined plane formed by spring E. This pressure moves the feed-bar on the hinge $n$, so that the feeder $l$, attached to it, is pressed forward, and thus gives feed to the cloth. By moving the upper end of the spring E from the feed-bar by set-screw V, the length of the stitch is increased, being regulated by means of this screw and spring.

The object of the spring F is to hold the feeder-bar Q in the position gained by the feed motion while the needle in descending and while the stitch is being tightened. It will be perceived that while the projection L is descending the inclined plane E the spring F will prevent the feed-bar from changing its position, and consequently the foot-piece will remain stationary upon the cloth till the downward motion of the projection L strikes the spring F and presses it downward and its end farther into the recess formed in the feeder-bar, as seen between the points T and U. When the spring F is thus pressed to the lowest point of the recess, as at point T, the spring G will have moved the feeder-bar and foot-piece back the length of a stitch.

B represents a spring acting on the thread of spool M. C represents a set-screw. It will be perceived that one end of this spring is attached to the lever N while the other acts upon the spool. The spool stands at right angles to the lever N and in its bend, forward of its center. When the needle is threaded and descends through the hole $w$ and the eyeless needle descends through the whole $w'$, the spear S moves forward, and, when the needle commences ascending, catches the loop from the needle, and the hooks $t$ and $t'$ move back, meeting the spear S, and take the loop from it and hold the loop still and spread, while the arm $u$ moves the length of the groove in this projection. While the loop is held by this hooks the needle descends and takes the loop from the points of the hooks, the hooks commencing to move back and open by their points yielding resistance against the needle. When the needle again descends, the spear again moves forward and takes the loop from the needle, the hooks in the meantime coming toward the spear, taking the loop and moving back a short distance with the spear, during which the loop is jointly held by the spear and hooks. The spear is then withdrawn from the loop, leaving it on the hooks, which hold it in proper position for the reception of the needle in its downward motion, and in this manner each loop is taken. The object of the projection $i$ and $i'$ is to press against the guide W, and thus make certain the reception of the needle by the loop when spread in the points $p$ and $p'$ of the hooks. The object of the eyeless needle is to prevent the cloth being pulled out of position by the foot-piece, and also to hold the cloth firmly in line of the stitch while the stitch is being tightened. In sewing with a fine needle, the needle is apt to be pressed out of its direct line by the cloth when the foot-piece moves back. The point X resists this pressure, and thus protects the needle.

What we claim, and desire to secure by Letters Patent, is—

1. The arrangement of the springs E, F, G, J, and I with the feeder-bar Q and feeder C, each operating in the manner and for the purpose herein specified.

2. The looping apparatus, composed of the frame-work Y, the spear S, the hooks $t$ and $t'$, and the guide W, operating substantially in the manner and for the purposes herein described.

JONATHAN S. BUELL.
WILLIAM T. BARNES.

Witnesses:
W. S. RICE,
A. SIMPSON McWILLIAMS.